US006993752B2

(12) United States Patent
Batthish

(10) Patent No.: US 6,993,752 B2
(45) Date of Patent: Jan. 31, 2006

(54) COMPILER WITH DYNAMIC LEXICAL SCANNER ADAPTED TO ACCOMMODATE DIFFERENT CHARACTER SETS

(75) Inventor: Ibrahim Batthish, Richmond Hill (CA)

(73) Assignee: International Business Machines Corporation, Armonk, NY (US)

( * ) Notice: Subject to any disclaimer, the term of this patent is extended or adjusted under 35 U.S.C. 154(b) by 603 days.

(21) Appl. No.: 10/108,683

(22) Filed: Mar. 28, 2002

(65) Prior Publication Data

US 2004/0015892 A1    Jan. 22, 2004

(30) Foreign Application Priority Data

May 25, 2001   (CA)   ................................. 2348718

(51) Int. Cl.
*G06F 9/45* (2006.01)

(52) U.S. Cl. ....................... 717/137; 717/136

(58) Field of Classification Search ................ 717/147, 717/111, 136, 137
See application file for complete search history.

(56) References Cited

U.S. PATENT DOCUMENTS 5,276,881 A * 1/1994 Chan et al. ................. 717/147

\* cited by examiner

*Primary Examiner*—Tuan Dam
*Assistant Examiner*—Chih-Ching Chow
(74) *Attorney, Agent, or Firm*—Owen J. Gamon

(57) ABSTRACT

A compiler comprises a lexical scanner with a dynamic character identification table that accommodates different standards for encoding characters in source and target characters. The scanner is associated with data files that enable conversion of the character identification table and also source code to conform to different standard character set representations. The scanner compares the character sets associated with the source and target codes. The source code is loaded into a buffer, and if a discrepancy in character sets exists, the buffered source code is converted to the target character set. The scanner also compares the character sets associated with the target code and the character identification table. If a mismatch exists, the scanner converts the character identification table to conform to the target character set. The lexical scanner provides greater flexibility in reading and generating program code.

3 Claims, 2 Drawing Sheets

COMPILER WITH DYNAMIC LEXICAL SCANNER ADAPTED TO ACCOMMODATE DIFFERENT CHARACTER SETS

FIELD OF THE INVENTION

The invention relates generally to compiling of source code, and more specifically, to a compiler with a lexical scanner adapted to handle different character sets.

BACKGROUND OF THE INVENTION

The application has particular, though not exclusive, application to compiling of C source code. A C compiler must normally handle the Standard C Character Set which consists of at least 91 characters (upper and lower case alphabetic characters, numbers, and symbols representing various operators). The characters are encoded in the source code with numeric values or "code points." Code points representing the complete sets of valid C characters are generally referred to as "character coded set identifiers" (CCSIDs). During initial phases of compilation, a lexical scanner module usually converts raw source code into corresponding tokenized target code. The lexical scanner relies on a character identification table embodying a particular CCSID to interpret the source code and identify individual characters.

The lexical scanner associated with a C compiler expects to receive source code associated with a particular character set. However, various CCSIDs are used to encode the Standard C Character Set, and source code incorporating one character set must be converted before the code may be compiled with a compiler that uses a different character set. Utilities are commonly available to convert C source code from one standard character set to another.

It would be desirable to provide a lexical scanner that can adapt itself dynamically to scan source code in different standard character sets and to produce corresponding target code in different standard character sets.

SUMMARY OF THE INVENTION

In one aspect, in a compiler with a lexical scanner that uses a character identification table to convert source code into corresponding target code, the invention provides a method of dynamically accommodating different character sets associated with source and target codes. Data is stored to allow conversion of either the source code or the table from one standard character set to another. Before actual scanning begins, the character set associated with the source code is compared with the target character set. If the character sets are different, the source code is translated to conform to the target character set. Similarly, the character set associated with the character identification is compared with the target character set. If the character sets are different, the table is converted to conform to the target character set. The dynamic nature of the character identification table allows the user to specify target code that uses a desired character set.

The term "character set" as used in this specification should be understood as encompassing a notional set of human intelligible characters in combination with numeric values (code points) that uniquely encode or identify the character. An item such as source code, target code, or a character identification table is "associated with," "converted to," or "translated to" a specific character set if the contents of the item are encoded using the point values of the character set.

Other aspects of the invention will be apparent from a description of a preferred embodiment below and will be more specifically defined in the appended claims.

DESCRIPTION OF THE DRAWINGS

The invention will be better understood with reference to drawings in which.

In the flowcharts, the direction of program flow is down the page and away from decision boxes unless otherwise indicated with arrows.

DESCRIPTION OF THE PREFERRED EMBODIMENTS

Figure 1:
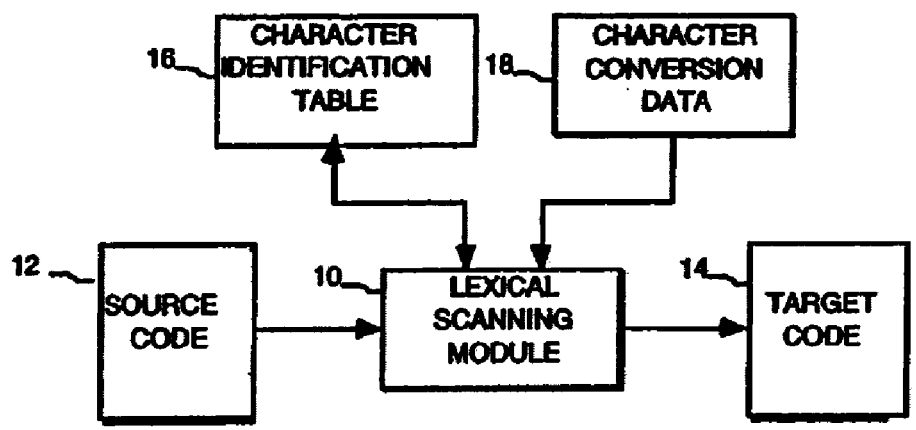
FIG. 1 is a diagrammatic representations of a dynamic lexical scanner.

Reference is made to FIG. 1 which diagrammatically illustrates a lexical scanning module 10 associated with a C compiler. The scanning module 10 receives C source code 12 from a disk file and produces tokenized C target code 14, which may be stored as a disk file. For purposes of discussion, it will be assumed that the source code 12 is associated with a character set identified as EBCDIC 00037 and the target code 14, with a character set identified as EBCDIC 00500, both IBM™ standards. Minor discrepancies exist between the two character sets. For example, the open bracket associated with a C-type indexing operator "[" is represented by the code point XXX in EBCDIC 00037 and the code point YYY in EBCDIC 00500. The present compiler is adapted in a conventional manner to permit a user to specify, as part of a desired target, the target character set to be used.

The lexical scanning module 10 relies on a character identification table 16 to interpret characters encoded in the source code 12. The table 16 is simply an array relating code points to specific characters of the Standard C Character Set. Unlike the prior art, the table 16 is dynamic, its contents being adjusted automatically, as discussed more fully below, to accommodate different target character sets. The information, specifically entry values, required to convert the table 16 to a desired character set is stored among conversion data 18, on disk. In its simplest form, the stored information may consist of distinct arrays, each associated with a different EBCDIC standard that the compiler is required to handle. The contents of the character identification table 16, which may be stored in RAM during operation, may simply be replaced with an appropriate array.

The conversion data 18 may also comprise several arrays for use in translating the source code 12 to any one of several different EBCDIC formats. Each entry of such an array effectively maps a code point of one EBCDIC format into another. With reference to the two EBCDIC formats specified above, the conversion array would, for example, map the value XXX representing the character "[" in EBCDIC 00037 into the value YYY used by EBCDIC 00500 to identify the same character. The entire source code 12 may be translated by loading the source code 12 into a buffer and replacing each code value in the source code 12 with the corresponding value extracted from the array.

Figure 2:
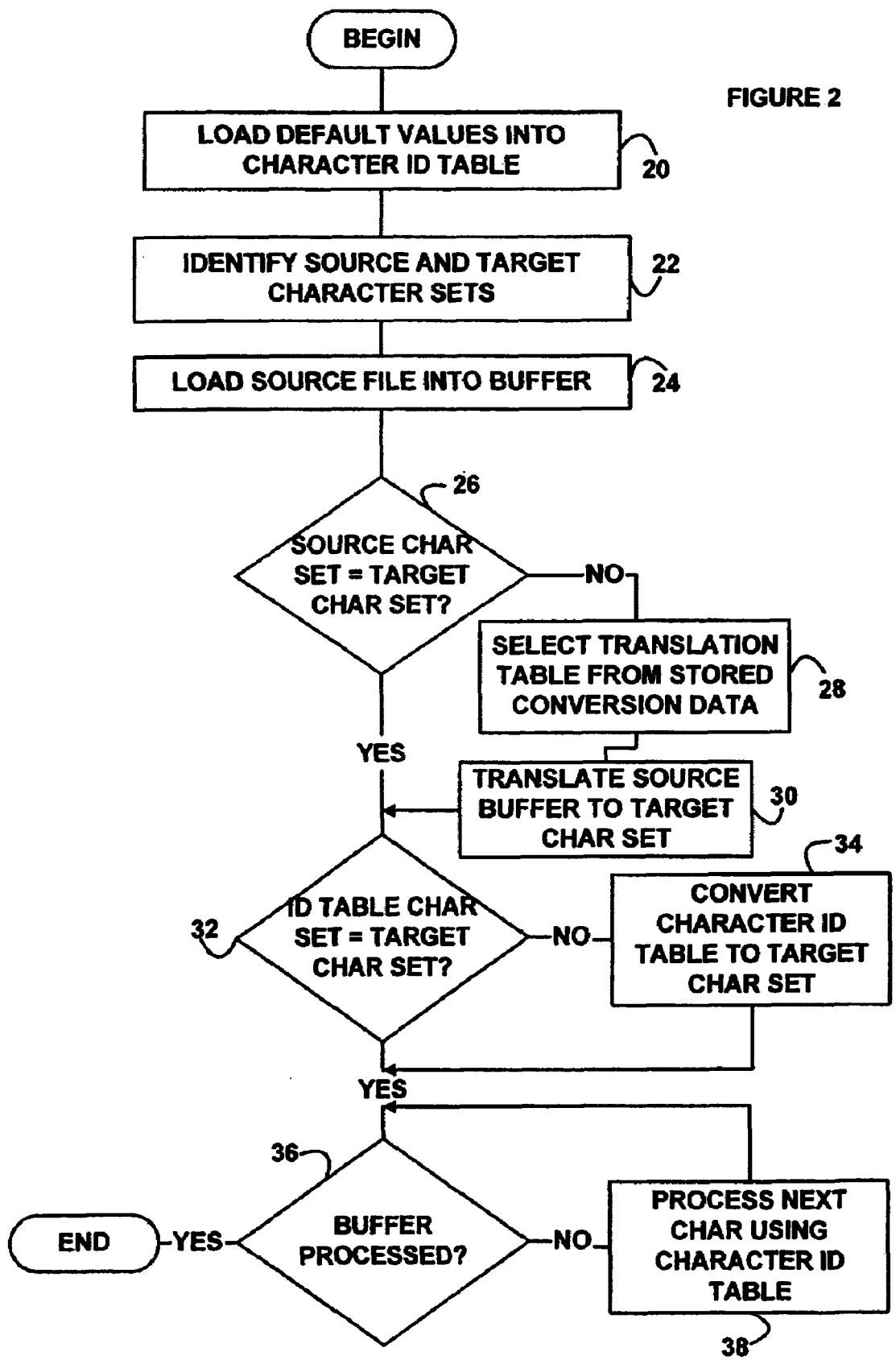
FIG. 2 is a flowchart illustrating a method of accommodating different character sets during lexical scanning.

How the scanning module 10 handles discrepancies in source and target character sets or user changes to specified target character sets will be described with reference to the flowchart of FIG. 2. During initialization, the compiler may load default values into the character identification table 16

(step 20) that correspond to a commonly used, default EBCDIC format. The character sets used by the source and targets codes 12, 14 are identified (step 22). The source character set (specifically the EBCDIC format associated with the source code 12) will normally be specified by the source file. The target character set may normally be set by the compiler to the default EBCDIC format, but, as mentioned above, the user may specify a different format when selecting a desired target. In any event, the character sets associated with the source code 12, target code 14, and the character identification table 16 are known or otherwise identified.

The scanning module 10 loads the source code 12 in a conventional manner from disk into a RAM buffer (step 24). The source character set is compared with the target character set (step 26). If the two character sets do not match, the buffered source code 12 is translated to the target character set: an appropriate translation array or table is retrieved from among the stored conversion data 18 (step 28), and each character value in the source buffer is replaced with a corresponding value extracted from the translation table (step 30). In this instance, a translation array mapping EBCDIC 00037 (source character set) into EBCDIC 00500 (target character sets) is used. The translation is conventional and standard routines may be used to perform the conversion.

The character set associated with the character identification table 16 is then compared with the target character set (step 32). If the two character sets do not match, the table 16 is converted to the target character set (step 32). Assuming that the user has changed target values, the character identification table 16 would be replaced with an array stored among the conversion data 18 that identifies characters associated with the target format, EBCDIC 00500.

Once the scanning module 10 has ensured that the buffered source code 12 and the character identification conform to the target character set, it processes the contents of the buffer on a character-by-character basis (steps 36, 38), producing the tokenized target code 14. Such conversion of the source code 12 is entirely conventional and will not be discussed further.

The program code associated with the compiler may be provided to users together with conversion data 18 for handling various character sets or translating source files on processor-readable medium. Third parties may also provide conversion data on such media to allow users to expand the number of different character set formats that the compiler can accommodate.

It will be appreciated that particular embodiments of the invention have been described and that modifications may be made therein without departing from the spirit of the invention or necessarily departing from the scope of the appended claims.

What is claimed is:

1. In a compiler comprising a processor-readable medium containing program code and data for operating a digital processor, the compiler comprising a lexical scanner that uses a character identification table during conversion of source code into corresponding target code, a method of dynamically accommodating different character sets associated with the source and target codes, the method comprising:

storing conversion data specifying conversion of each of the character identification table and the source code from any one of a plurality of predetermined characters sets to any other of the plurality of predetermined character sets, wherein each of the predetermined character sets comprises respective sets of characters and numeric values that uniquely identify the respective characters;

comparing a source character set with a target character set, and converting the source code with the stored conversion data from being encoded with the source character set to being encoded with the target character set if the source and target character sets are different, wherein the source character set is one of the plurality of predetermined character sets and the target character set is one of the plurality of predetermined character sets; and, comparing a table character set with the target character set, and converting the character identification table with the stored conversion data from being encoded with the table character set to being encoded with the target character set if the table and target character sets are different, wherein the table character set is one of the plurality of predetermined character sets.

2. In a compiler comprising a processor-readable medium containing program code and data for operating a digital processor, the compiler comprising a lexical scanner that uses a character identification table during conversion of source code into corresponding target code, a method of dynamically accommodating different character sets associated with the source and target codes, the method comprising:

storing conversion data specifying conversion of each of the character identification table and the source code from any one of a plurality of predetermined character sets to any other of the plurality of predetermined character sets, wherein each of the predetermined character sets comprises respective sets of characters and numeric values that uniquely identify the respective characters;

identifying a source character set associated with the source code, a target character set associated with the target code, and a table character set associated with the character identification table, wherein the source character set is one of the plurality of predetermined character sets, the target character set is one of the plurality of predetermined character sets, and the table character set is one of the plurality of predetermined character sets;

loading the source code from a file into a buffer;

comparing the source character set with the target character set, and converting the buffered source code with the stored conversion data from being encoded with the source character set to being encoded with the target character set if the source character set is different from the target character set;

comparing the table character set with the target character set, and converting the character identification table with the stored conversion data from being encoded with the table character set to being encoded with the target character set if the table character set is different from the target character set; and, scanning the buffered source code to generate the target code, the scanning comprising accessing the character identification table to identify characters in the buffered source code.

3. A compiler product comprising a processor-readable medium containing program code and data for operating a digital processor, the compiler comprising a lexical scanner that uses a character identification table to convert source code into target code, the compiler comprising:

conversion data specifying conversion of each of the character identification table and the source code from any one of a plurality of predetermined characters sets to any other of the plurality of predetermined character sets, wherein each of the predetermined character sets comprises respective sets of characters and numeric values that uniquely identify the respective characters;

comparing a source character set with a target character set, and converting the source code with the conversion data from being encoded with the source character set to being encoded with the target character set if the source and target character sets are different, wherein the source character set is one of the plurality of predetermined character sets and the target character set is one of the plurality of predetermined character sets; and, comparing the table character set with the target character set, and converting the character identification table with the conversion data from being encoded with the table character set to being encoded with the target character set if the table and target character sets are different.

* * * * *